United States Patent
Mizuno

(10) Patent No.: US 8,699,193 B2
(45) Date of Patent: Apr. 15, 2014

(54) PROTECTION CIRCUIT FOR A POWER CONVERSION APPARATUS

(75) Inventor: Osamu Mizuno, Yokkaichi (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 399 days.

(21) Appl. No.: 13/225,311

(22) Filed: Sep. 2, 2011

(65) Prior Publication Data

US 2012/0063180 A1   Mar. 15, 2012

(30) Foreign Application Priority Data

Sep. 3, 2010   (JP) .................................. 2010-197451

(51) Int. Cl.
*H02H 3/00*   (2006.01)
*H02H 3/20*   (2006.01)
*H02H 9/04*   (2006.01)

(52) U.S. Cl.
USPC .......................................... 361/88; 361/91.1

(58) Field of Classification Search
USPC ........................................................ 361/88
See application file for complete search history.

(56) References Cited

U.S. PATENT DOCUMENTS

| 5,912,794 | A | * | 6/1999 | Ichikawa | 361/92 |
| 6,078,490 | A | * | 6/2000 | Walters | 361/88 |
| 7,427,936 | B2 | * | 9/2008 | Takeuchi | 341/120 |
| 2011/0148360 | A1 | * | 6/2011 | Lee | 320/134 |

FOREIGN PATENT DOCUMENTS

JP   09-238476 A   9/1997

* cited by examiner

*Primary Examiner* — Dharti Patel
(74) *Attorney, Agent, or Firm* — Rabin & Berdo, P.C.

(57) ABSTRACT

A protection circuit that interrupts a supply of power to a driving circuit for a power conversion apparatus upon detection of an abnormality includes switches connected in series between the power supply and the driving circuit. An interruption signal enabling/disabling circuit controls the transmission of an interruption signal from the power conversion apparatus to one of the switches and turns the switch off. A monitoring circuit monitors a voltage output from the switches, and determines that the switch which is to be turned off is in a short-circuit state if the voltage is a normal value. A switch may also be determined to be in a short-circuit fault state if the interruption signal turns the switches off, and if a monitored voltage output from the switches decreases at a decay rate faster than a decay rate in a condition where the switch is not in a short-circuit state.

13 Claims, 3 Drawing Sheets

14, 15: buffer IC with an enable terminal

PROTECTION CIRCUIT FOR A POWER CONVERSION APPARATUS

CROSS-REFERENCE TO RELATED APPLICATION

This application is based on, and claims priority to, Japanese Patent Application No. 2010-197451, filed on Sep. 3, 2010, the contents of which are incorporated herein by reference.

BACKGROUND OF THE INVENTION

1. Field of the Invention

The present invention relates to a protection circuit for a power conversion apparatus having semiconductor switching elements. The protection circuit detects abnormality in the power conversion apparatus and interrupts a power supply to a driving circuit for the switching elements, thereby protecting the power conversion apparatus.

2. Description of the Related Art

FIGS. 3(a) and 3(b) show essential parts of a conventional protection circuit for a power conversion apparatus such as an inverter.

The protection circuit of FIG. 3(a) is called a series-connected redundancy circuit. On an abnormality in the power conversion apparatus, the protection circuit interrupts power supply to a gate driving circuit for semiconductor switching elements such as IGBTs that compose the power conversion apparatus. This interruption is carried out by switches 21 and 22 composed of relays or transistors that are series-connected to each other. The protection circuit of FIG. 3(b) is called a parallel-connected redundancy circuit. The protection circuit interrupts power supply to a gate driving circuit for upper arm switching elements and power supply to a gate driving circuit for lower arm switching elements of the power conversion apparatus by means of parallel-connected switches 21 and 22 separately for the respective gate driving circuits.

In FIGS. 3(a) and 3(b), the reference numeral 10 represents a control circuit board for controlling the switches 21 and 22 according to an interruption signal emitted on an abnormality in the power conversion apparatus; the symbols 20A and 20B represent driving circuit board for supplying or interrupting the power supply to the gate driving circuit; the reference numeral 11 represents a signal input terminal for receiving the interruption signal; the reference numeral 12 represents a photo-coupler for signal isolation; and the reference numeral 13 represents a CPU.

The protection circuit of FIGS. 3(a) and 3(b) perform protection for the power conversion apparatus on an abnormality such as a short-circuit fault with the semiconductor switching elements in the following way. An interruption signal received at the signal input terminal 11 is given through photo-couplers 12 to the switches 21 and 22, which are simultaneously turned OFF to interrupt power supply to the gate driving circuit. As a consequence, all the switching elements are turned OFF to interrupt output of the power conversion apparatus. Thus, the power conversion apparatus is protected.

In order to ensure redundancy required by the safety standards, it is assumed that a plurality of switches, the switches 21 and 22 in the example of FIGS. 3(a) and 3(b), are connected in series or in parallel and every time operate in the same state, which means that every switch is in the ON state or every switch is in the OFF state.

The safety standards further require that a fault of each switch causing failure of redundancy has to be detected as much as possible. Accordingly, the CPU 13 reads an output from the series-connected circuit of switches 21 and 22 in FIG. 3(a) and outputs from the parallel-connected switches of 21 and 22 in FIG. 3(b), thereby monitoring the state of signals at relevant points and any fault of the switches.

The protection circuits of FIGS. 3(a) and 3(b) have a circuit construction called a power supply interruption system in which a power supply to the gate driving circuit is interrupted on an abnormality. Another type of protection circuit called a signal interruption system is known in which all the gate driving signals for the power conversion apparatus, six signals in the case of three-phase power conversion apparatus, are turned OFF using buffer ICs with 3-state output in place of the switches described above.

The following describes advantages and disadvantages in the power supply interruption system and in the signal interruption system. The power supply interruption system here is assumed to have two switches 21 and 22 as in FIGS. 3(a) and 3(b).

<Power Supply Interruption System>

(1) Series-Connected Redundancy Circuit (FIG. 3(a))

Advantage: The protection circuit is not adversely affected by change of states and variation of characteristics in the switches 21 and 22.

Disadvantage: it is impossible or extremely difficult to identify, in any short-circuit fault, which of the switches has short-circuited.

(2) Parallel-Connected Redundancy Circuit (FIG. 3(b))

Advantage: Since the CPU has received an output signal from each of the switches 21 and 22, it is rather ready to identify, in any short-circuit fault, which of the switches has short-circuited.

Disadvantage: Due to change of states and variation of characteristics in the switches 21 and 22, unintended operation occurs transiently. In addition, signal lines are necessary for transmitting output signals from the switches 21 and 22 to the CPU 13 in order to detect a short-circuit fault of each of the switches 21 and 22. When the CPU 13 and the switches 21 and 22 are placed on the separate circuit boards 10 and 20B as shown in FIG. 3(b), the number of connector terminals increases resulting in enlarged circuit board area and increased costs.

<Signal Interruption System>

(1) Series-Connected Redundancy Circuit

Advantage: The protection circuit is scarcely affected by change of states and variation of characteristics of each of the buffer ICs.

Disadvantage: A large number of objects for fault monitoring are necessary due to six gate signals in addition to terminal inputs. Moreover, in a fault in which one buffer IC is fixed to the enable condition, fault detection is impossible or extremely difficult.

(2) Parallel-Connected Redundancy Circuit

Advantage: A fault of each of the buffer ICs is rather readily detected.

Disadvantage: Due to change of states and variation of characteristics in the buffer ICs, unintended operation occurs transiently. In addition, a large number of objects are to be monitored as in the series-connected redundancy circuit, making the fault detection circuit complicated.

FIG. 4 shows a construction of an abnormality detection and protection circuit for, which semiconductor elements in a signal interruption system disclosed in Japanese Unexamined Patent Application Publication No. H09-238476. In FIG. 4, the reference numeral 30 represents a semiconductor switching element of an upper arm or a lower arm in a power conversion apparatus; 41 represents a short-circuit detection means; 42 represents an overcurrent detection means; 43 represents an insufficient voltage detection means; 44 represents overheating detection means; the reference numerals 51 through 54 represents abnormality storage circuits provided corresponding to the detection means 41 through 44; the reference numeral 60 represents abnormality informing circuits; 70 represents a general control system; 80 represents a driving circuit for generating a gate signal to the switching element 30; and the reference numeral 90 represents an operation stopping means.

The circuit of FIG. 4 detects various types of abnormalities in the switching element 30 by the detection means 41 through 44 and stores them in the abnormality storage circuits 51 through 54. When the abnormality is a type of requiring emergency protection, the operation stopping means 90 is operated based on the outputs from the abnormality storage circuits 51 through 54 and the gate signal for the switching element 30 is forced to be grounded, thereby stopping the operation of the switching element 30.

When the abnormality is not a type of requiring emergency protection, the outputs from the abnormality storage circuits 51 through 54 are sent through the abnormality informing circuits 60 to the general controlling system 70, which executes processing including change of logic of a switching command to be sent to the driving circuit 80, corresponding to the type of abnormality and the conditions of the switching elements in the other arm.

The protection circuit of the signal interruption system as described above needs a large number of monitoring objects and thus, the fault detection circuit tends to become complicated.

The protection circuit of the power supply interruption system is difficult to detect individual short-circuit fault of each switch separately. The parallel connected redundancy circuit in particular, needs the same number of signal lines and connector terminals as the number of switches in order to detect the individual short-circuit fault, which results in complicated circuits, enlarged circuit area, and increased costs.

SUMMARY OF THE INVENTION

In view of the above-described problems, it is an object of the present invention to provide a protection circuit for a power conversion apparatus that eliminates disadvantages of the signal interruption system by employing the power supply interruption system, allows detection of individual short-circuit fault of each of the switches for power supply interruption, and reduces the number of signal lines and connector terminals for fault detection.

In a first aspect of the invention, a protection circuit that interrupts a supply of power to a driving circuit for a power conversion apparatus upon detection of an abnormality is provided. The protection circuit includes a switch circuit including first and second switches. The protection circuit further includes an interruption signal enabling/disabling circuit that in a first state enables transmission of an interruption signal to the first and second switches so that the first and second switches are turned on or off according an on or off state of the interruption signal. In a second state, the interruption signal enabling/disabling circuit disables transmission of the interruption signal to the first switch and transmits an off signal to the first switch to turn the first switch off and enables transmission of the interruption signal to the second switch. The off state of the interruption signal corresponds to a detection of an abnormality in the power conversion apparatus and the on state of the interruption signal corresponds to an absence of a detection of an abnormality in the power conversion apparatus. The protection circuit further includes a control circuit that controls the interruption signal enabling/disabling circuit by delivering a control signal to the interruption signal enabling/disabling circuit that causes the interruption signal enabling/disabling circuit to enter the first state or the second state. A monitoring circuit that monitors a voltage transmitted from the power supply to the driving circuit at an output of the switch circuit. The monitoring circuit determines that the first switch is in a short-circuit fault state if the monitored voltage has a value equal to the value of an output voltage of the first switch when the first and second switches are on and power is transmitted from the power supply through the first and second switches, the control circuit delivers the control signal to cause the interruption signal enabling/disabling circuit to be in the second state and the interruption signal is in the on state.

In another aspect of the invention, a protection circuit interrupts a supply of power to a driving circuit for a power conversion apparatus upon detection of an abnormality. A first switch and a second switch are connected in series between the power supply and the driving circuit, wherein the first switch is connected to the driving circuit and the second switch is connected to the power supply. The first switch receives an interruption signal from the power conversion apparatus and is turned on or off according to an on or off state of the interruption signal. An interruption signal enabling/disabling circuit in a first state enables transmission of an interruption signal to the second switch so that the second switch is turned on or off according the on or off state of the interruption signal. In a second state the interruption signal enabling/disabling circuit disables transmission of the interruption signal to the second switch and transmits an off signal to the second switch to turn the second switch off. The off state of the interruption signal corresponds to a detection of an abnormality in the power conversion apparatus and the on state of the interruption signal corresponding to an absence of a detection of an abnormality in said apparatus. A control circuit controls the interruption signal enabling/disabling circuit by delivering a control signal to the interruption signal enabling/disabling circuit that causes the interruption signal enabling/disabling circuit to enter the first state or the second state. A first resistor is connected at a connection point between the first and second switches to ground. A second resistor and a capacitor are connected in parallel between first and second ends, the first end connected to ground, the second end connected to an output of the first switch. A monitoring circuit monitors a voltage transmitted from the power supply to the driving circuit at said output of the first switch. The monitoring circuit determining that the second switch is in a short-circuit fault state if the monitored voltage has a value equal to the value of an output voltage of the first switch when the first and second switches are on and power is transmitted from the power supply through the first and second switches, the control circuit delivers the control signal to cause the interruption signal enabling/disabling circuit to be in the second state, and the interruption signal is in the on state. In response to the interruption signal being changed from the on state to the off state, the monitoring circuit further determines that the first switch is in a short-circuit fault state if the monitored voltage decreases at a decay rate faster than a decay rate in a condition where the first switch is not in a short-circuit state.

A protection circuit for a power conversion apparatus according to the present invention allows separate detection of a short-circuit fault of individual switch for interrupting a driving circuit power supply by an interruption signal and reduces the number of signal lines and connector terminals for fault detection, thereby achieving simplification of construction of the protection circuit and reduction of costs.

DETAILED DESCRIPTION OF THE INVENTION

Some preferred embodiments of a protection circuit for a power conversion apparatus according to the present invention will be described in the following with reference to accompanying drawings.

Figure 1:
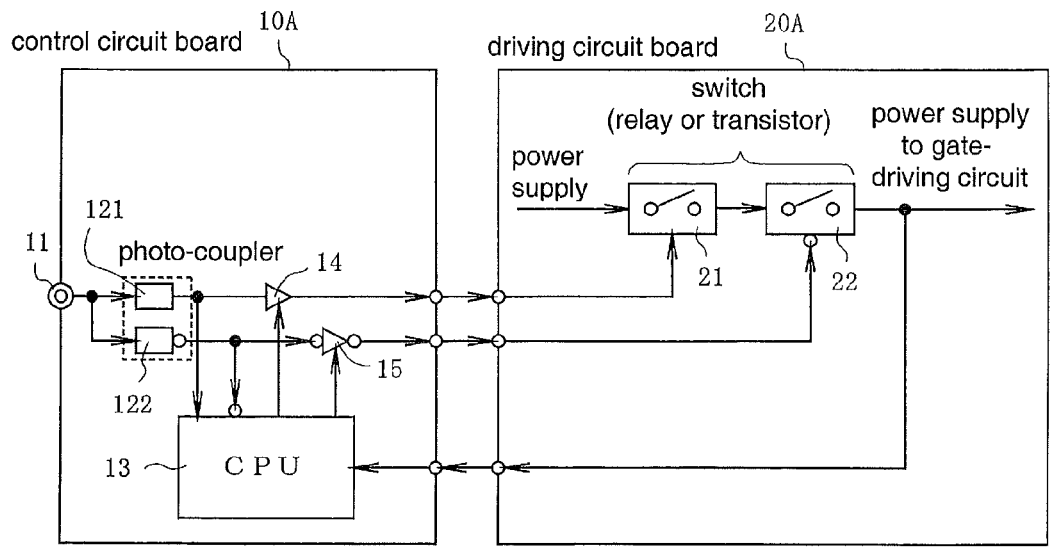
FIG. 1 shows a construction of the first embodiment according to the present invention.

FIG. 1 shows a construction of essential parts of a protection circuit for a power conversion apparatus of the first embodiment according to the present invention. The protection circuit of the first embodiment is constructed in a series-connected redundancy circuit of the power supply interruption system like the protection circuit of FIG. 3(a), interrupting the gate driving circuit power supply for semiconductor switching elements such as IGBTs on an abnormality of the power conversion apparatus.

Figure 3A:
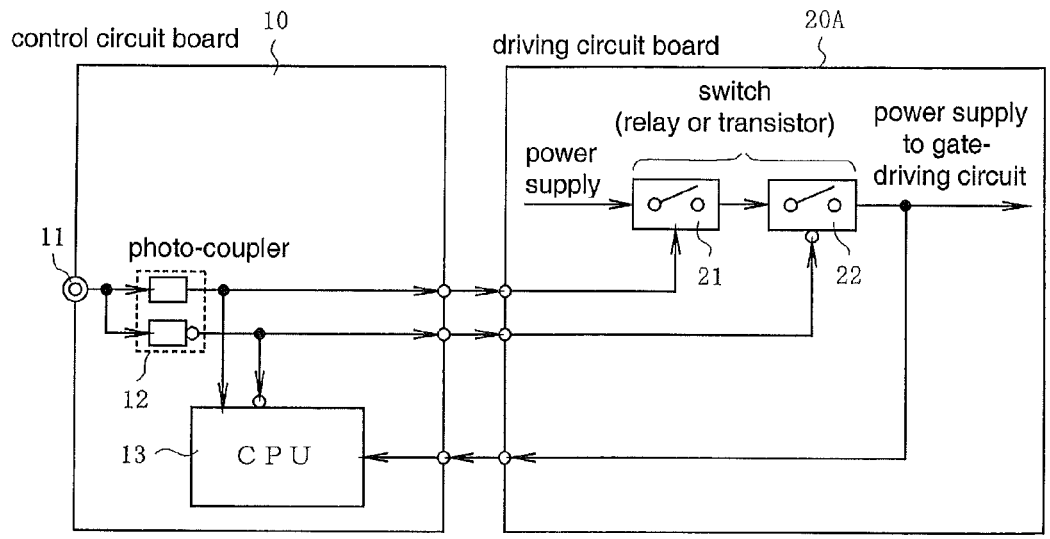
FIGS. 3(a) and 3(b) show constructions of essential parts of conventional protection circuits.
Figure 3B:
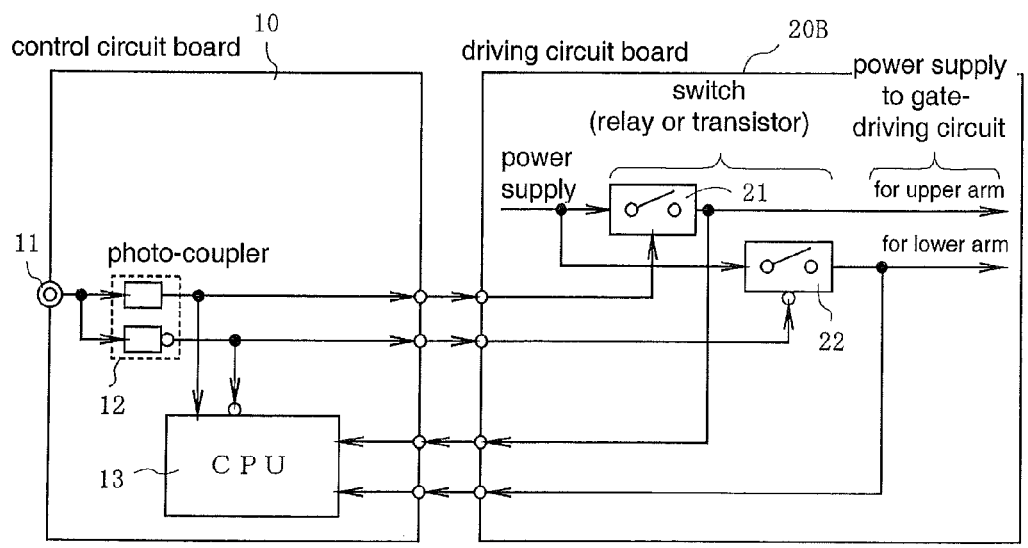
Figure 4:
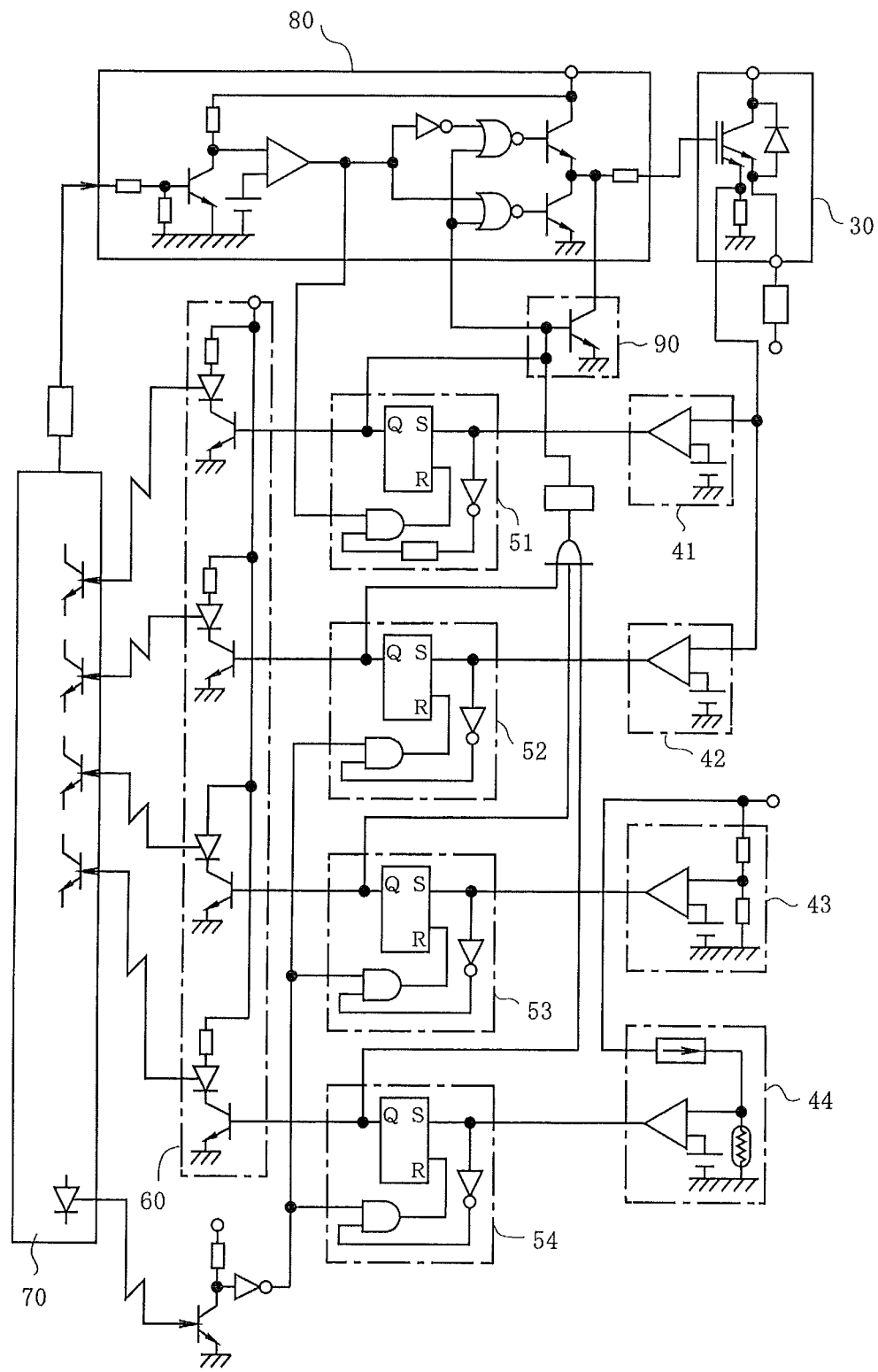
FIG. 4 shows the abnormality detection and protection circuit disclosed in Japanese Unexamined Patent Application Publication No. H09-238476.

Referring to FIG. 1, the symbol 10A represents a control circuit board for controlling the switches 21 and 22 by interruption signals; and the symbol 20A represents, like in FIG. 3(a), a driving circuit board for supplying or interrupting the gate driving circuit power supply.

The reference numeral 11 represents a signal input terminal for receiving the interruption signal on an abnormality in the power conversion apparatus; and the reference numerals 121 and 122 represent photo-couplers for signal isolation provided corresponding to the switches 21 and 22. The reference numeral 13 represents a CPU to which inputted are output signals from the photo-couplers 121 and 122 and an output signal from the series connected circuit of the switches 21 and 22.

For the interruption signal mentioned above, it is defined that an OFF state of the interruption signal corresponds to an OFF state of the switches 21 and 22 (power supply interruption state) and an ON state of the signal corresponds to an ON state of the switches 21 and 22 (power supplying state).

The reference numerals 14 and 15 represent buffer ICs with 3-state output that are interruption signal enabling/disabling means provided between the output from the photo-coupler 121 and the switch 21 and between the output from the photo-coupler 122 and the switch 22, respectively. The enable terminal of each buffer IC receives an enable signal that is a control signal from the CPU 13. Enable/disable (ON/OFF) of the buffer IC can be controlled according to the control signal delivered by the CPU 13.

In operation of the protection circuit for a power conversion apparatus of the first embodiment, the CPU 13 delivers a control signal to the enable terminal of the buffer ICs 14 and 15 with 3-state output in a constant cycle, the control signal compelling to disable the buffers 14 and 15 individually according to operation of a processing program. Every time the CPU 13 delivers the control signal, a power supply voltage level of the gate driving circuit is read by the CPU 13 from the output side of the switch 22 in the driving circuit board 20A.

In a condition in which the switches 21 and 22 have no defect and operation thereof is normal, when one of the switches, for example the switch 21, is turned OFF receiving a signal through the buffer IC with 3-state output controlled by the CPU 13, the gate driving circuit power supply is interrupted despite the ON state of the other switch 22 connected in series with the switch 21 and the power supply voltage level read by the CPU 13 becomes a zero volt level. Nevertheless, if the switch 21 is in a short-circuit fault condition, despite a control signal from the CPU 13 for compelling to turn the switch 21 OFF through the buffer IC 14, the OFF operation is impossible and the switch 21 stays in the ON state. Since the other series-connected switch 22 is in the ON state, the power supply voltage level read by the CPU 13 becomes, for example, a level of 5 volts or 15 volts.

When the CPU 13 gives a control signal for turning the switch 21 OFF to the buffer IC 14, if the power supply voltage level taken out from the driving circuit board 20A is a normal value, it can be presumed that the switch 21 is in a short-circuit fault condition. Similarly, when the CPU 13 gives a control signal for turning the switch 22 OFF to the buffer IC 15, if the power supply voltage level taken out from the driving circuit board 20A is a normal value, it can be presumed that the switch 22 is in a short-circuit fault condition.

In this embodiment, despite only one signal line for taking out the power supply voltage of the gate driving circuit from the driving circuit board 20A to the CPU 13, individual detection is possible on the short-circuit fault of the switches 21 and 22. Consequently, the protection circuit of the invention can do with a small number of signal lines and connection terminals, thereby achieving simplification of the circuit and cost reduction.

Figure 2:
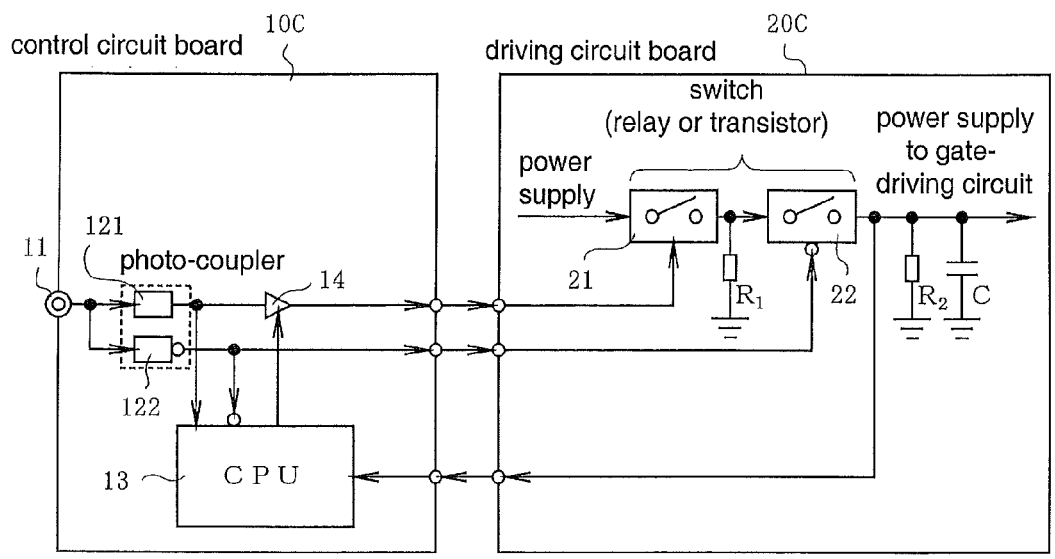
FIG. 2 shows a construction of the second embodiment according to the present invention.

The second embodiment according to the invention is described in the following. FIG. 2 shows a construction of essential parts of the second embodiment. The protection circuit of the second embodiment, like that of the first embodiment, has a construction of a series-connected redundancy circuit in the power supply interruption system, which interrupts the gate driving circuit power supply on an abnormality of the power conversion apparatus.

In the control circuit board 10C of FIG. 2, solely a buffer IC 14 with 3-state output is connected between one of the photo-coupler 121 and the switch 21, and the other photo-coupler 122 is connected directly to the switch 22.

The CPU 13 receives output signals from the photo-couplers 121 and 122 and an output signal from the series-connected circuit of the switches 21 and 22. The CPU 13 delivers a control signal, which is an enable signal, to the enable terminal of the buffer IC 14 with 3-state output.

The driving circuit board 20C comprises a resistance R1 having a resistance value R provided between the switches 21 and 22, one end of the resistance R1 being grounded. The driving circuit 20C further comprises a pair of a resistance R2 and a capacitor C connected in parallel provided between the output side of the switch 22 and a gate driving circuit (not illustrated in the figure). The resistance R2 has a resistance value R equal to the resistance value of the resistance R1 and one end the resistance R2 is grounded. The capacitor C has a capacitance value C and one end of the capacitor C is grounded.

Operation of the second embodiment is described in the following. First described is operation for detection of a short-circuit fault in the switch 21.

The CPU 13, receiving an interruption signal in the OFF state from the signal input terminal 11, outputs a control signal to turn the buffer IC 14 with 3-state output into a disabled state by an operation of a processing program. After change of the interruption signal from the OFF state to the ON state, the CPU 13 reads the power supply voltage level of the gate driving circuit from the output side of the switch 22.

If the switch 21 is not in a short-circuit fault condition, the switch 21 is in the OFF state. Since the power supply for the gate driving circuit is interrupted, the power supply voltage level read by the CPU 13 is at zero volt level. If switch 21 is in a short-circuit fault condition, however, since the other switch 22 has changed to the ON state, the power supply voltage level read by the CPU 13 is at a level of 5 volts or 15 volts, for example, because the both switches 21 and 22 are in the ON state.

Therefore, when the power supply voltage level taken out from the driving circuit board 20C is at a normal level after change of the interruption signal from the OFF state to the ON state, the switch 21 can be presumed to be in a short-circuit fault state.

Next, detection of a short-circuit fault in the other switch 22 is described.

For this detection, the CPU 13 monitors a decay rate of the power supply voltage for the gate driving circuit after change of the interruption signal given to the signal input terminal 11 from the ON state to the OFF state.

If the switch 22 is not in a short-circuit fault condition, that is, in a normal condition, the both switches 21 and 22 turn OFF responding to the change of the interruption signal. Since the parallel circuit of the resistor R2 and the capacitor C is connected to the input side of the gate driving circuit, which is the output side of the switch 22, the power supply voltage for the gate driving circuit, which is the voltage on the capacitor C, decreases with discharge of the capacitor C in a time constant R C.

If the switch 22 is in a short-circuit fault condition, the switch 22 stays in the ON state while the switch 21 turns OFF. Consequently, the driving circuit board 20C becomes to have a circuit construction in which the parallel circuit of the resistor R1, the resistor R2, and the capacitor C is connected to the input side of the gate driving circuit, which is the output side of the switch 21. As a result, the power supply voltage for the gate driving circuit, which is the voltage on the capacitor C, decreases with discharge of the capacitor C in a time constant R C/2. Thus, the power supply voltage decreases faster than in the normal state of the switch 22.

Therefore, a short-circuit fault state of the switch 22 can be presumed by a faster decay rate of the power supply voltage read by the CPU 13 than in the normal state.

In the embodiments described above, the CPU has a function as a control means for controlling the buffer ICs 14 and 15 with 3-state output and a function as a monitoring means for monitoring a short-circuit fault state of the switches 21 and 22 based on the power supply voltage read by the CPU 13 from the driving circuit board 20A or the driving circuit board 20C. These functions, however, can be performed by a separately provided control circuit and a monitoring circuit.

A protection circuit of the invention can be applied not only to an inverter but also to a wide variety of power conversion apparatuses, without any limitation on a construction of the power conversion apparatuses or types of switching elements.

What is claimed is:

1. A protection circuit that interrupts a supply of power to a driving circuit for a power conversion apparatus upon detection of an abnormality, the protection circuit comprising:
    a switch circuit including a first switch and a second switch connected in series between the power supply and the driving circuit;
    an interruption signal enabling/disabling circuit that
        in a first state enables transmission of an interruption signal from the power conversion apparatus to the first and second switches so that the first and second switches are turned on or off according an on or off state of the interruption signal, and
        in a second state disables transmission of the interruption signal to the first switch and transmits an off signal to the first switch to turn the first switch off and enables transmission of the interruption signal to the second switch,
    the off state of the interruption signal corresponding to a detection of an abnormality in the power conversion apparatus and the on state of the interruption signal corresponding to an absence of a detection of an abnormality in said apparatus;
    a control circuit that controls the interruption signal enabling/disabling circuit by delivering a control signal to the interruption signal enabling/disabling circuit that causes the interruption signal enabling/disabling circuit to enter the first state or the second state; and
    a monitoring circuit that monitors a voltage transmitted from the power supply to the driving circuit at an output of the switch circuit, the monitoring circuit determining that the first switch is in a short-circuit fault state if
        the monitored voltage has a value equal to the value of an output voltage of the first switch when the first and second switches are on and power is transmitted from the power supply through the first and second switches,
        the control circuit delivers the control signal to cause the interruption signal enabling/disabling circuit to be in the second state, and
        the interruption signal is in the on state.

2. The protection circuit for a power conversion apparatus according to claim 1, wherein the power conversion apparatus includes semiconductor switching elements, and the off state of the interruption signal causes an interruption of the power supply to the switching elements.

3. The protection circuit for a power conversion apparatus according to claim 1, wherein
    the interruption signal enabling/disabling circuit includes a third state that disables transmission of the interruption signal to the second switch and transmits an off signal to the second switch to turn the second switch off and enables transmission of the interruption signal to the first switch,
    the control circuit controls the interruption signal enabling/disabling circuit by delivering a control signal to cause the interruption signal enabling/disabling circuit to enter the third state, and
    the monitoring circuit determines that the second switch is in a short-circuit fault state if
        the monitored voltage is the normal value,
        the control circuit delivers the control signal to cause the interruption signal enabling/disabling circuit to be in the third state, and
        the interruption signal is in the on state.

4. The protection circuit for a power conversion apparatus according to claim 1, further comprising a CPU that includes both the monitoring circuit and the control circuit.

5. The protection circuit for a power conversion apparatus according to claim 4, further comprising a signal input terminal that receives the interruption signal and transmits that interruption signal to the CPU and to the interruption signal enabling/disabling circuit.

6. The protection circuit for a power conversion apparatus according to claim 4, wherein the interruption signal enabling/disabling circuit includes buffer ICs with 3-state outputs.

7. The protection circuit for a power conversion apparatus according to claim 1, wherein the interruption signal enabling/disabling circuit includes buffer ICs with 3-state outputs.

8. A protection circuit that interrupts a supply of power to a driving circuit for a power conversion apparatus upon detection of an abnormality, the protection circuit comprising:
- a first switch and a second switch connected in series between the power supply and the driving circuit, wherein the first switch is connected to the driving circuit and the second switch is connected to the power supply, the first switch receiving an interruption signal from the power conversion apparatus and being turned on or off according to an on or off state of the interruption signal;
- an interruption signal enabling/disabling circuit that
  - in a first state enables transmission of the interruption signal to the second switch so that the second switch is turned on or off according the on or off state of the interruption signal, and
  - in a second state disables transmission of the interruption signal to the second switch and transmits an off signal to the second switch to turn the second switch off, the off state of the interruption signal corresponding to detection of an abnormality in the power conversion apparatus and the on state of the interruption signal corresponding to an absence of a detection of an abnormality in said apparatus;
- a control circuit that controls the interruption signal enabling/disabling circuit by delivering a control signal to the interruption signal enabling/disabling circuit that causes the interruption signal enabling/disabling circuit to enter the first state or the second state;
- a first resistor connecting a connection point between the first and second switches to ground;
- a second resistor and a capacitor connected in parallel between first and second ends, the first end connected to ground, the second end connected to an output of the first switch; and
- a monitoring circuit that monitors a voltage transmitted from the power supply to the driving circuit at said output of the first switch, the monitoring circuit:
  (1) determining that the second switch is in a short-circuit fault state if
     the monitored voltage has a value equal to the value of an output voltage of the first switch when the first and second switches are on and power is transmitted from the power supply through the first and second switches,
     the control circuit delivers the control signal to cause the interruption signal enabling/disabling circuit to be in the second state, and
     the interruption signal is in the on state, and
  (2) in response to the interruption signal being changed from the on state to the off state, determining that the first switch is in a short-circuit fault state if the monitored voltage decreases at a decay rate faster than a decay rate in a condition where the first switch is not in a short-circuit state.

9. The protection circuit for a power conversion apparatus according to claim 8, further comprising a CPU that includes both the monitoring circuit and the control circuit.

10. The protection circuit for a power conversion apparatus according to claim 9, further comprising a signal input terminal that receives the interruption signal and transmits that interruption signal to the CPU, and to the interruption signal enabling/disabling circuit.

11. The protection circuit for a power conversion apparatus according to claim 9, wherein the interruption signal enabling/disabling circuit includes a buffer IC with a 3-state output.

12. The protection circuit for a power conversion apparatus according to claim 8, wherein the interruption signal enabling/disabling circuit includes a buffer IC with a 3-state output.

13. The protection circuit for a power conversion apparatus according to claim 8, wherein the power conversion apparatus includes semiconductor switching elements, and the off state of the interruption signal causes an interruption of the power supply to the switching elements.

* * * * *